Figure 1:
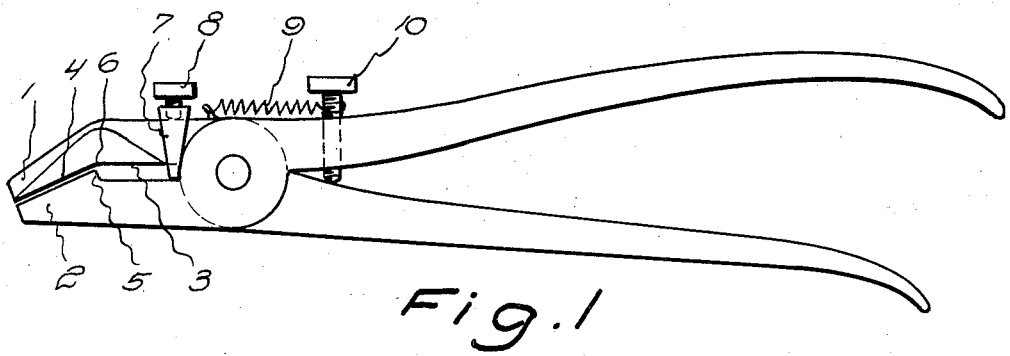

Sept. 8, 1936.  J. L. SJÖDIN  2,053,639

SAW SETTING TOOL

Filed April 25, 1935

Inventor
Jonas L. Sjodin

Patented Sept. 8, 1936

2,053,639

UNITED STATES PATENT OFFICE 2,053,639

SAW SETTING TOOL

Jonas Leonard Sjödin, Ostersund, Sweden

Application April 25, 1935, Serial No. 18,250
In Sweden May 22, 1934

1 Claim. (Cl. 76—64)

The present invention refers to a manually operable saw setting tool in the shape of a pair of tongs and adapted, when used, to straddle the toothed edge of the saw blade.

The primary object of the invention is to provide a setting tool which may be used to advantage even on the thinnest saw blades and the smallest teeth, such employment being impossible when using the ordinary setting tools hitherto known.

The invention is illustrated in the accompanying drawing which shows a preferred embodiment thereof. In the drawing:—

Figure 2:
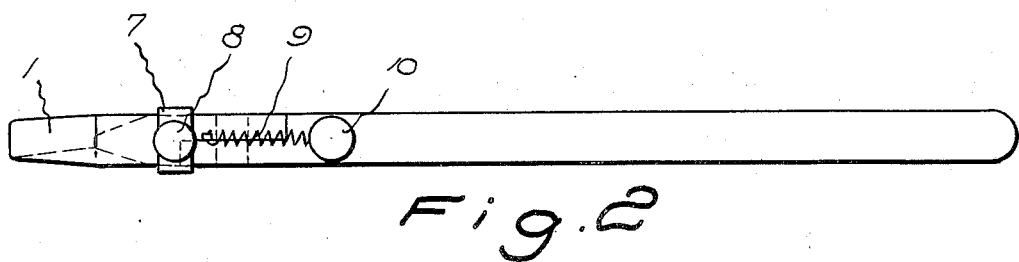

Fig. 1 shows an elevation of the tool, and
Fig. 2 shows the same seen from above.

The construction of the handle portion of the setting tongs is of no consequence to the invention, and the essential characteristics of the latter refer to the shaping, or construction, of the setting faces provided on the jaws.

The one jaw 1, and preferably that one intended to be placed on the upper side of the saw blade when positioned horizontally, is provided with two adjacent setting faces 3 and 4. The innermost of them 3, positioned nearest to the pivot bolt of the tongs and forming a supporting face for the saw tooth proper, has the shape of an isosceles triangle the base of which coincides with the innermost portion of the gap between the jaws, whereas the outermost setting face 4 forms an agle 6 less than 180° with the inner one and serves as a supporting face for the body portion of the saw blade. The lower jaw 2 has a setting face consisting substantially of a ridge 5 only, such ridge being positioned in opposition to the apex of the angle between the setting faces on the upper jaw, and being adapted to enter into said angle when the jaws are pressed towards each other.

The setting of the saw teeth is performed in such a manner that the ridge 5 presses the base of the saw tooth into the angle 6 of the upper jaw, and since the body of the saw blade, when setting the teeth, is always in contact with the face 4 while the tooth of the same to be set is in contact wih he face 3, the tool will always give a satisfactory result without special adjustment and independently of the width of the saw blade and the size and thickness of its teeth.

The setting face 3 may also be constructed otherwise than in the shape of a triangle, but it must always be tapering in a direction towards the angle 6 for being adapted to act upon saw teeth even of a very small size.

As the face 3 is tapering towards the angle 6, the amount of setting (angular deviation of the teeth from the plane of the saw blade body) will always be visible, and may be controlled if desired. For such purpose the portion of the upper jaw 1 corresponding to the setting face 4 may be provided with a recess in the one or both sides, as indicated in the drawing. In the drawing, this recess is supposed to be of a triangular shape (compare Fig. 2), but even other shapes may be used without endangering the purpose.

In order to secure an increased correctness at the setting, one of the jaws of the tongs, for instance the upper one, may be provided with a lengthwise slidable member 7 having a set screw 8 for locking the same in a predetermined position on said jaw. This member 7 has a transverse portion extending into the gap between the jaws and forming an abutment for limitation of the maximal insertion of the saw blade teeth, thus determining the depth to which the entrance of such teeth is permitted. The said member 7 is adjusted according to the different sizes (heights) of the saw blades, teeth, and in case each tooth is inserted as far as permitted, a completely straight setting line for all of the teeth is secured independently of the size of said teeth.

The amount of setting of the teeth is adjustable by means of a control screw 10 determining the limit of the extent to which the jaws of the tool may be pressed towards each other, and in order that the gap between the jaws may be automatically opened, a return spring 9 may be provided in one manner or the other.

What I claim and desire to secure by Letters Patent is:—

In a saw setting tool of the character described, two handle members hingedly connected by means of a pivot bolt, a jaw member connected with each of the handle members, such jaw members extending cross-wise in relation to the pivot bolt and in the direction of length of the corresponding handle member, setting means provided on one of the jaw members at the side facing the other one, such setting means consisting of two adjacent and rigidly connected setting faces positioned at a sharp angle of less than 180° and tapering towards each other, setting means provided on the other jaw member and consisting of a ridge adapted to enter the apex of said angle when closing the jaws, an abutment member provided within the gap between the jaws and adapted to be adjusted in the direction of length of the latter, and adjustable means for limiting the closing movement of the jaws by means of the handles.

JONAS LEONARD SJÖDIN.